United States Patent Office 2,705,708
Patented Apr. 5, 1955

2,705,708

DISAZO DYESTUFFS

Ernst Keller, Basel, Switzerland, assignor to J. R. Geigy S. A., Basel, Switzerland, a Swiss company No Drawing. Application June 27, 1952,
Serial No. 296,079

Claims priority, application Great Britain August 16, 1951

6 Claims. (Cl. 260—187)

The present process is concerned with the manufacture of disazo dyestuffs of good water-solubility which are suitable as cyan components in colour films or papers for making colour records.

It has been found that when diazotised amino-phenyl-benzyl ethers or diazotised amino-diphenyl ethers, which may contain in the benzene rings additional substituents usually found in azo dyes, particularly additional ether groups, but not water-solubilising acid groups, are coupled with 1-amino-2-alkoxy-(or 2-carboxy-methoxy)-naphthalene-6- or 7-sulphonic acids and the resultant amino monoazo dyestuffs are further diazotised and coupled in an alkaline medium with a 1.8-dihydroxy or 1-amino-(or substituted amino)-8-hydroxy-naphthalene-mono- or disulphonic acid, which couples in the ortho position to the hydroxyl group, blue-green disazo dyestuffs of good purity of the general Formula I can be obtained:

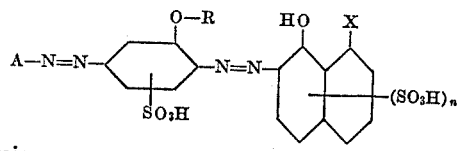

wherein

A is the residue of a diazotised amino-phenyl-benzyl ether or amino-diphenyl ether as defined above,
R is a lower alkyl or carboxy-methyl group,
X is a hydroxyl, amino or alkylamino, arylamino or acylamino group, and
n is an integer having the value 1 or 2.

The compounds used as first components in the invention are obtained by known methods as, for example, by condensation at an elevated temperature of alkali phenolates with nitrobenzene derivatives containing mobile halogens, or of benzyl halides with nitrophenols in the presence of acid binding agents, followed by reduction of the nitro group to the amino group. Of particular suitability as substituents in the benzene rings of the diazo components are alkyl groups, e. g. methyl tertiary butyl, tertiary amyl or iso-octyl groups, and halogens, especially chlorine atoms. Of outstanding value in the process of the invention, however, are amino benzene compounds which contain more than one phenoxy group as, for example, the compounds obtained by the condensation at an elevated temperature of 1.3-dichloro-4-nitrobenzene derivatives with the alkali salts of phenol, its homologues or its halogen derivatives, followed by reduction of the nitro group to the amino group.

The diazotisation of the compounds used as first components is carried out by known methods, in solution or suspension in mineral acid, with alkali nitrite, organic solvents such as lower fatty acids, their amides and dialkyl amides, and lower alcohols, etc. being present if necessary. The coupling with the middle components (of which 1-amino-2-alkoxy-naphthalene-6- or 7-sulphonic acids with lower alkyl radicles or the carboxy-methyl radicle, and in particular 1-amino-2-methoxy- or -ethoxy-naphthalene-6-sulphonic acid are preferred in the process of the invention) is carried out appropriately in weakly acidic aqueous solution or suspension. The diazotisation of the amino monoazo dyestuff is advantageously carried out by the indirect method and the final coupling effected in the presence of alkalies such as ammonia or sodium carbonate, and of basic accelerators such as pyridine bases. Suitable, in the process of the invention, end components which couple in the ortho position to the hydroxyl group are 1.8-dihydroxy-naphthalene- or 1-amino-(or substituted amino)-8-hydroxynaphthalene-mono- and disulphonic acids containing a sulphonic acid group in the 4-, 5- or 6-position with respect to the 8-hydroxyl group, the second sulphonic acid group, if present, occupying one of the 2-, 3- and 4-positions depending on the position occupied by the first sulphonic acid group. Examples of compounds which can be used in the invention are: 1.8-dihydroxy-naphthalene-5- or 6-sulphonic acids, 1.8-dihydroxy-naphthalene - 3.6 - disulphonic acid, 1 - amino - 8 - hydroxy-naphthalene-2.4-disulphonic acid, 1-amino-8-hydroxy-naphthalene-4-sulphonic acid, 1-amino-8-hydroxy-naphthalene-3.6- and 4.6-disulphonic acids, and the N-alkyl, -aryl and -acyl derivatives of these compounds, 1.8-dihydroxy - naphthalene - 3.6 - disulphonic acid, 1 - amino-8-hydroxy-naphthalene-2.4-disulphonic acid and the acyl derivatives of 1-amino-8-hydroxy-3.6-disulphonic acid being especially useful.

In the form of their alkali salts the disazo dyestuffs of the invention are dark powders of good water-solubility, and they give aqueous solutions and dyed gelatin layers which are blue-green in colour, the colour being of good purity. In the silver-dye-bleach process of colour photography they only require a short bleaching time, and they can, therefore, be used advantageously in the preparation of the cyan layer in colour films or in photographic papers for making colour records. Because of their remarkable affinity for gelatin the dyestuffs have the great advantage that they have little or no tendency to diffuse into adjacent gelatin layers in films or papers used for colour photography which contain a plurality of gelatin layers. The use of the dyestuffs in the silver-dye-bleach process of colour photography forms the subject matter of our co-pending application Serial No. 296,078 of even date herewith now Patent No. 2,694,636.

The following are examples of dyes of especial value for the said purpose.

Dyestuff A

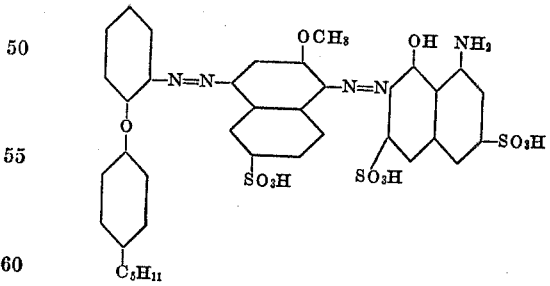

Dyestuff B

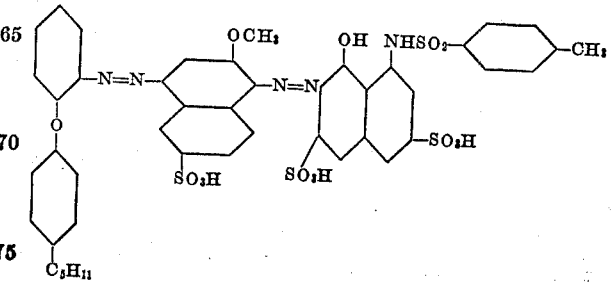

Dyestuff C

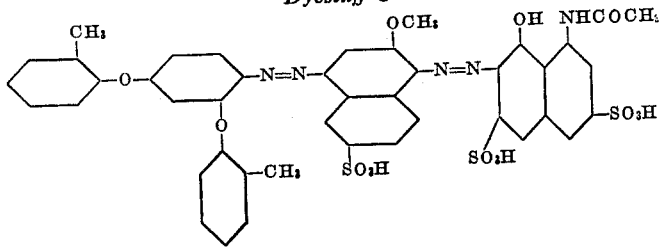

Dyestuff D

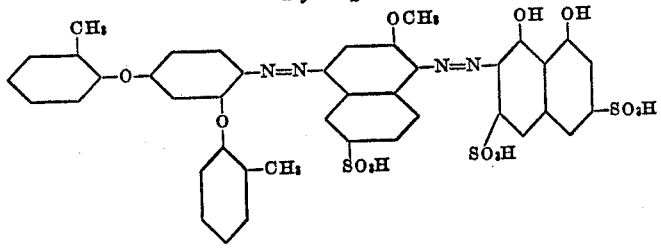

Dyestuff E

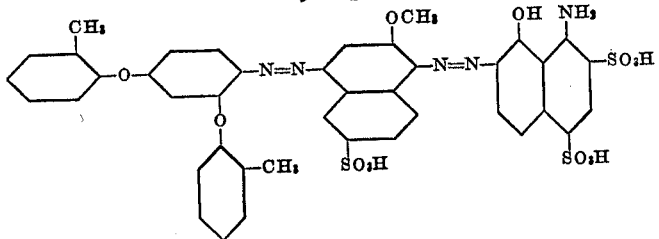

The following examples illustrate, but do not limit, the invention. The quantities, unless otherwise stated, are by weight and the temperatures are given in degrees centigrade. The quantities by weight bear the same relation to the quantities by volume as kilogramme does to litre.

EXAMPLE 1

30.5 parts of 1 - amino - 2.4 - di - (2'-methylphenoxy)-benzene are dissolved, most advantageously with alcohol or another suitable solvent and indirectly diazotised at 3–5°. The temperature is reduced to 0° by the addition of ice and a weakly acid to litmus solution of 25.3 parts of 1-amino-2-methoxynaphthalene-6-sulphonic acid is added to the diazo compound. The coupling is completed at a weakly acid to litmus reaction. The aminoazo dyestuff so formed is isolated and then washed until no more 1-amino-2-methoxynaphthalene-6-sulphonic acid can be traced in the filtrate. The damp filter cake is then pasted at room temperature at a weakly alkaline reaction to brilliant yellow, 7.5 parts of $NaNO_2$ are added and then at 14° 25 parts of conc. hydrochloric acid are poured in. The product is further diazotised for several hours at 14–16° and any excess nitrite is broken down by the addition of sulphonamic acid, after which the diazo compound is cooled to 0–3°. The compound is then, in the presence of pyridine, combined with a soda or an ammonia alkaline solution of 32 parts of 1.8-dihydroxynaphthalene-3.6-disulphonic acid. On completion of the coupling, the dyestuff is salted out and purified by thorough washing or dissolving and recrystallising.

When dry, the dyestuff (which is Dye D above) is a dark powder which very easily dissolves in water with a blue-green colour and it dyes gelatin layers in clear blue-green shades. The gelatin dyeings are characterised by the very good fixation of the dyestuff.

As it is important to produce the dyestuff in the purest form possible, it may be advantageous to isolate the diazo compound of the aminoazo dyestuff before the coupling. This is of particular advantage when the aminoazo dyestuff is obtained in such a form that it is impossible or very difficult to rinse with 1-amino-2-methoxynaphthol-6-sulphonic acid without a residue being left.

EXAMPLE 2

The diazo compound of the monoazo dyestuff described in Example 1 obtained from 1-amino-2.4-di-(2'-methylphenoxy)-benzene and 1-amino-2-methoxynaphthalene-6-sulphonic acid is coupled at 0-5° in the presence of pyridine to a soda or ammonia alkaline solution of 31.9 parts of 1-amino-8-hydroxynaphthalene-2.4-disulphonic acid. On completion of the coupling, the dyestuff is salted out with common salt and filtered, after which it is purified by thorough washing or dissolving and recrystalising and dried. It forms a dark powder (Dye E above) and dissolves in water with a blue-green colour and dyes gelatin layers a pure blue-green shade.

Other similar dyestuffs which dye gelatin layers a slightly more green shade are obtained if, in the above example, the 1-amino-8-hydroxynaphthalene-2.4-disulphonic acid is replaced by 1-acetylamino-8-hydroxynaphthalene-3.6-disulphonic acid (yielding Dye C above) or 1-(p-toluene sulphonyl)-amino-8-hyroxynaphthalene-3.6-disulphonic acid. A further similar but somewhat less easily soluble dyestuff is obtained if 1-methylamino-8-hydroxynaphthalene-4-sulphonic acid is used instead of the end component used in the above example. Another also somewhat more difficultly soluble dyestuffs is obtained if 1-acetylamino-8-hydroxynaphthalene-4-sulphonic acid is used as end component. This dyestuff dyes gelatin in a still more green shade with excellent fixation.

EXAMPLE 3

27.7 parts of 1-amino-2.4-diphenoxybenzene are indirectly diazotised as described in Example 1 and coupled at a weakly acid reaction to litmus with 29.7 parts of 1-amino-2-naphthoxy acetic acid-6-sulphonic acid. On completion of the coupling, the aminoazo dyestuff is isolated and washed until no trace of 1-amino-2-naphthoxy acetic acid-6-sulphonic acid can be found in the filtrate. The dyestuff is than pasted again at 40° at a definite alkaline reaction and the temperature is afterwards reduced to 10° by the addition of ice, 7.5 parts of $NaNO_2$ are added and finally 35 parts of conc. hydrochloric acid are poured in. Further diazotisation is carried out for several hours at 10–12° after which the diazo compound is added, in the presence of pyridine, to a soda or ammonia alkaline solution of 31.9 parts of 1-amino-8-hydroxynaphthalene-3.6-disulphonic acid. The temperature for the coupling is reduced at first by the addition of ice to 2–5° and then allowed to rise slowly to room temperature. On completion of the coupling, the disazo dyestuff so obtained is salted out with common salt and filtered. When dry, it is a dark powder. It dissolves very easily in water with a blue-green colour and dyes gelatin layers in pure blue-green shades.

A dyestuff with practically the same properties is obtained if, in the above example, the 1-amino-2.4-diphenoxybenzene is replaced by 1-amino-2.4-di-(2'-methylphenoxy)-benzene.

EXAMPLE 4

25.6 parts of 2-amino-4'-tert. amyl diphenyl ether are diazotised in the usual way at 0–3° and coupled at a weakly acid reaction to litmus to 25.3 parts of 1-amino-2-methoxynaphthalene-6-sulphonic acid. On completion of the coupling, the dyestuff is isolated and washed until no trace of 1-amino-2-methoxynaphthalene-6-sulphonic acid can be found in the filtrate. The aminoazo dyestuff is then dissolved at 50° at a weakly alkaline reaction, 7.5 parts of $NaNO_2$ are added and the temperature is then reduced to 14° by the addition of ice. Thereupon 25 parts of conc. hydrochloric acid are added and it is diazotised for several hours at 14–16°. On completion of the diazotisation, the temperature is reduced to 5–8° and at this temperature and in the presence of pyridine, the product is coupled with a soda or ammonia alkaline solution of 47.3 parts of 1-(p-toluene sulphonyl)-amino-8-hydroxynaphthalene-3.6-disulphonic acid. On completion of the coupling, the dyestuff (Dye B above) is isolated in the usual way and purified by thorough washing or dissolving and recrystallising. It dissolves in water with a blue-green colour and dyes gelatin layers in clear blue-green shades which are characterised by their very good fixation.

A dyestuff (Dye A above) with similar properties but of a somewhat more greenish shade is obtained if, in the above example, the 1-(p-toluene sulphonyl)-amino-8-hydroxynaphthalene-3.6-disulphonic acid is replaced by 1-amino-8-hydroxynaphthalene-3.6-disulphonic acid.

A further similar dyestuff is obtained if 2-amino-4'-octyldiphenyl ether is used as starting product instead of 2-amino-4'-tert. amyl diphenyl ether.

EXAMPLE 5

22 parts of 4-chloro-2-aminodiphenyl ether are diazotised in the usual way and coupled at a weakly acid reaction with 25.3 parts of 1-amino-2-methoxynaphthalene-6-sulphonic acid. The aminoazo dyestuff when washed is further diazotised as described in Example 4 and, in the presence of pyridine, coupled with a soda or ammonia alkaline solution of 42.3 parts of 1-(p-toluene sulphonyl)-amino-8-hydroxynaphthalene - 3.6 - disulphonic acid. On completion of the coupling, the disazo dyestuff is salted out with common salt, filtered and purified by thorough washing or dissolving and recrystallisation. It dissolves in water with a blue-green colour and dyes gelatin layers in clear blue-green shades which are characterised by their very good fixation.

A similar dyestuff is obtained if, in the above example, the 1-(p-toluene sulphonyl)-amino - 8 - hydroxynaphthalene-3.6-disulphonic acid is replaced by 1-benzene sulphonyl-amino-8-hydroxynaphthalene-3.6-disulphonic acid.

A further dyestuff with similar properties but a somewhat more greenish shade is obtained if 1-amino-8-hydroxynaphthalene-2.4-disulphonic acid is used as end product. As has been described in the co-pending application regarding the application of the dyestuffs claimed, this dyestuff requires less time in the bleaching process.

EXAMPLE 6

21.3 parts of 2-amino-4-methylphenyl benzyl ether are diazotised in the usual way, coupled with 25.3 parts of 1-amino-2-methoxynaphthalene-6-sulphonic acid, the intermediate dyestuff so formed is purified and as described in the previous example, further diazotised. The diazo compound of the aminoazo dyestuff is coupled, in the presence of pyridine, with a soda or ammonia alkaline solution of 1-amino-8-hydroxynaphthalene-2.4-disulphonic acid. The disazo dyestuff so formed is purified in the usual way. It dissolves in water with a blue-green colour and dyes gelatin layers a pure blue-green shade, but these dyeings have a somewhat less good fixation than those described in Examples 4 and 5.

A dyestuff which dyes gelatin in somewhat more greenish shades is obtained if the 1-amino-8-hydroxynaphthalene-2.4-disulphonic acid is replaced by 1-amino-8-hydroxynaphthalene-3.6-disulphonic acid.

Another dyestuff with similar properties is obtained if, instead of 2-amino-4-methylphenyl-benzyl ether, 2-amino-4-amylbenzyl ether is used as starting material.

EXAMPLE 7

30.5 parts of 1-aminophenyl-2.4-dibenzyl ether are indirectly diazotised in the usual way at 3–5°. The temperature is brought to 0–2° by the addition of ice and a weakly acid (to litmus) solution of 25.3 parts of 1-amino-2-methoxynaphthalene-6-sulphonic acid is added to the diazo compound. The coupling is completed with a definite acid (to litmus) reaction, after which the aminoazo dyestuff formed is isolated and washed. There should be no trace of 1-amino-2-methoxynaphthalene-6-sulphonic acid in the washing liquor. The dyestuff so purified is then suspended in water at room temperature with a weakly alkaline reaction and is then diazotised at 14–15°. The reaction mixture is kept for several hours at this temperature until completion of the diazotisation. Finally, a slight excess of nitrite is eliminated if necessary. The diazo compound is then cooled to 0–3° and coupled with 31.9 parts of 1-amino-8-hydroxynaphthalene-2.4-disulphonic acid in a soda alkaline or ammonia alkaline solution in the presence of pyridine. On completion of the coupling, the dyestuff is salted out, filtered off and thoroughly washed. By recrystallisation from, e. g. acetone or dioxan or by extraction with these solvents, the dyestuff can be freed from any by-products present. The dyestuff dissolves in water with a blue-green colour and dyes gelatin layers a pure blue-green shade.

A similar dyestuff is obtained if 1-aminophenyl-2.5-dibenzyl ether is used instead of 1-aminophenyl-2.4-dibenzyl ether.

The use of organic solvents, such as acetone, is also advantageous for purifying the products of the foregoing examples.

What we claim is:

1. A disazo dyestuff having the general formula:

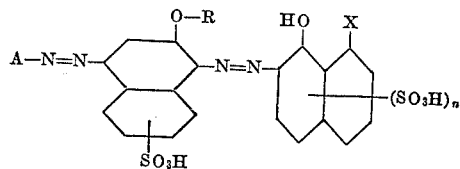

wherein A represents the residue of a diazotised amino compound selected from the group consisting of aminodiphenyl ethers and aminophenyl-benzyl ethers free from water-solubilising acid groups, R represents a member selected from the group consisting of methyl and ethyl, X represents a member selected from the group consisting of OH, $NH_2$ and acylamino groups, and $n$ is an integer selected from 1 and 2.

2. The dyestuff of the formula:

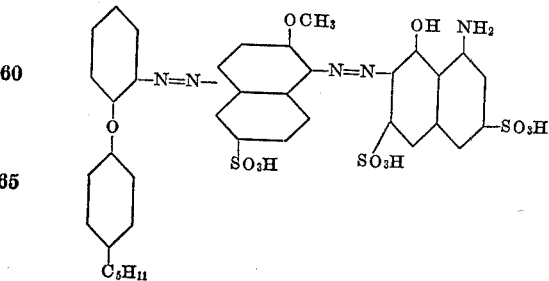

3. The dyestuff of the formula:

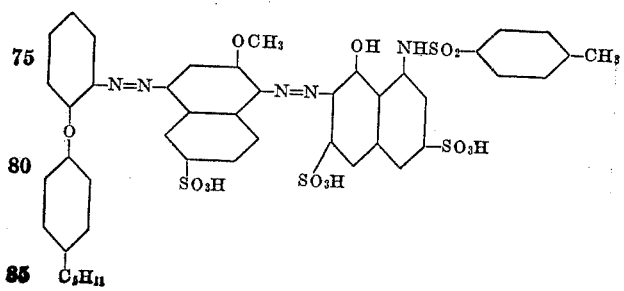

4. The dyestuff of the formula:
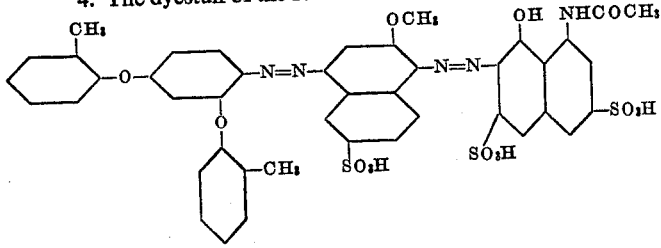
5. The dyestuff of the formula:
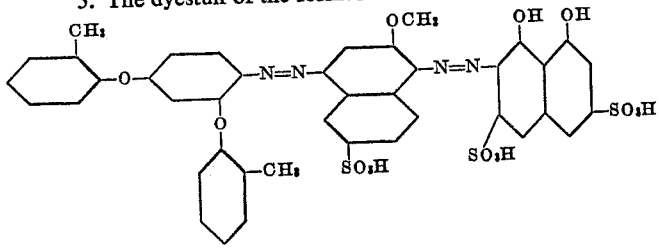
6. The dyestuff of the formula:
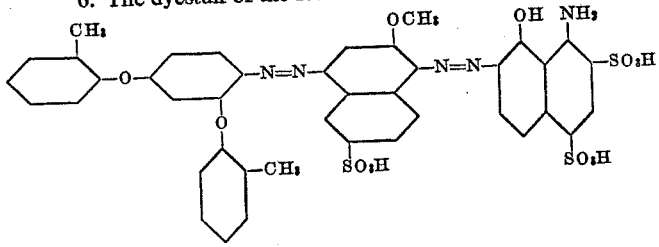
References Cited in the file of this patent
UNITED STATES PATENTS
| | | |
|---|---|---|
| 1,504,134 | Neelmeier et al. | Aug. 5, 1924 |
| 1,855,963 | Hentrich et al. | Apr. 26, 1932 |
| 2,385,698 | Fleischaver et al. | Sept. 25, 1945 |